United States Patent
Liang et al.

(10) Patent No.: US 10,714,757 B2
(45) Date of Patent: *Jul. 14, 2020

(54) CURRENT COLLECTOR, ELECTRODE PLATE INCLUDING THE SAME AND BATTERY

(71) Applicant: CONTEMPORARY AMPEREX TECHNOLOGY CO., LIMITED, Ningde, Fujian Province (CN)

(72) Inventors: Chengdu Liang, Ningde (CN); Huafeng Huang, Ningde (CN); Zuyu Wu, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,377

(22) Filed: Dec. 4, 2018

(65) Prior Publication Data

US 2019/0173093 A1 Jun. 6, 2019

(30) Foreign Application Priority Data

Dec. 5, 2017 (CN) .......................... 2017 1 1268789

(51) Int. Cl.
*H01M 4/66* (2006.01)
*H01M 4/04* (2006.01)
(Continued)

(52) U.S. Cl.
CPC ......... *H01M 4/667* (2013.01); *H01M 4/0404* (2013.01); *H01M 4/661* (2013.01);
(Continued)

(58) Field of Classification Search
None
See application file for complete search history.

(56) References Cited

U.S. PATENT DOCUMENTS 8,399,113 B2 * 3/2013 Nakura ................. H01M 2/348
429/163
2004/0126663 A1 7/2004 Sudano et al.
(Continued)

FOREIGN PATENT DOCUMENTS

CN 107123812 A 9/2017
CN 107369810 A 11/2017
(Continued)

OTHER PUBLICATIONS

Office Action from corresponding Japanese Application No. 2018153406, dated Oct. 8, 2019, 4 pages.
(Continued)

*Primary Examiner* — Rena Dye Cronin
(74) *Attorney, Agent, or Firm* — Tucker Ellis LLP (57) ABSTRACT

The present disclosure provides a current collector, an electrode plate and a battery. The current collector includes an insulation layer and at least one conductive layer located on at least one surface of the insulation layer. The insulation layer is used to support the conductive layer, and the conductive layer is used to support an electrode active material layer. The conductive layer has a thickness of D2, and 300 nm ≤ D2 ≤ 2 μm. The current collector further includes a protective layer provided on a surface of the conductive layer facing towards the insulation layer. The current collector according to the present disclosure can increase a short-circuit resistance in case of short circuit caused by the battery being abnormal, thereby resulting in protective effect on the conductive layer, and can also increase the bonding force between the insulation layer and the conductive layer, thereby increasing mechanical strength of the current collector.

20 Claims, 6 Drawing Sheets

(51) Int. Cl.
  *H01M 10/0525* (2010.01)
  *H01M 4/02* (2006.01)
  *H01M 10/052* (2010.01)

(52) U.S. Cl.
  CPC ........... *H01M 4/664* (2013.01); *H01M 4/668* (2013.01); *H01M 10/0525* (2013.01); *H01M 4/662* (2013.01); *H01M 4/663* (2013.01); *H01M 10/052* (2013.01); *H01M 2004/028* (2013.01)

(56) References Cited

U.S. PATENT DOCUMENTS

| | | | |
|---|---|---|---|
| 2004/0197641 | A1 | 10/2004 | Visco et al. |
| 2011/0052985 | A1* | 3/2011 | Kashiwazaki ......... H01G 11/38 429/217 |
| 2011/0281167 | A1 | 11/2011 | Sabi et al. |
| 2012/0052378 | A1* | 3/2012 | Torata ..................... H01M 4/13 429/209 |
| 2013/0017441 | A1* | 1/2013 | Affinito ............... H01M 2/1673 429/211 |
| 2014/0079984 | A1 | 3/2014 | Kajitani et al. |
| 2017/0301921 | A1 | 10/2017 | Ebisuzaki et al. |
| 2017/0309951 | A1* | 10/2017 | Ishikawa ................ H01M 2/34 |

FOREIGN PATENT DOCUMENTS

| | | |
|---|---|---|
| CN | 206649947 U | 1/2018 |
| EP | 2577772 A1 | 4/2013 |
| JP | 1154147 A | 2/1999 |
| JP | 2004273304 A | 9/2004 |
| JP | 2006512722 A | 4/2006 |

OTHER PUBLICATIONS

Extended European Search Report for corresponding Application No. 18192302.0, dated Feb. 13, 2019, 9 pages.

* cited by examiner

CURRENT COLLECTOR, ELECTRODE PLATE INCLUDING THE SAME AND BATTERY

CROSS-REFERENCE TO RELATED APPLICATIONS

The present application claims priority to Chinese Patent Application No. CN201711268789.9, filed on Dec. 5, 2017, the content of which is incorporated herein by reference in its entirety.

TECHNICAL FIELD

The present disclosure relates to the technical field of battery, and in particular, relates to a current collector, an electrode plate including the current collector, a battery.

BACKGROUND

Lithium-ion batteries have been widely applied in electric vehicles and consumer electronic products due to their advantages such as high energy density, high output power, long cycle life, and low environmental pollution. However, when lithium-ion batteries are subjected to abnormal conditions such as extrusion, collision, or puncture, they can easily catch fire or explode, causing serious problems. Therefore, the safety issue of the lithium-ion batteries greatly limits the application of disclosure and popularization of the lithium-ion batteries.

A large number of experimental results show that an internal short circuit in a battery is the ultimate cause of safety hazards of the lithium-ion batteries. In order to avoid the internal short circuit in the battery, the researchers tried to improve the separator structure, battery mechanical structure and the like. Some of these studies have improved the safety performance of lithium-ion batteries by modifying the design of current collectors.

The temperature in the battery may rise when an internal short circuit occurs in the battery due to abnormal conditions such as collision, extrusion, or puncture and the like. According to a technical solution in the related art, alloy having a low melting point is added into the material of a metal current collector. With increasing of the temperature of the battery, the alloy having low-melting point in the current collector begins to melt, thereby resulting in a broken circuit of an electrode plate and cutting off the current. In this way, the safety of the battery is improved. According to another technical solution in the prior art, a multilayered current collector is adopted, in which both sides of a resin layer are connected with metal layers to form a composite. When the temperature of the battery reaches a melting point of the material of the resin layer, the resin layer of the current collector melts to damage the electrode plate, thereby cutting off the current, and enhancing the safety of the battery.

However, these solutions in the related art cannot effectively prevent the occurrence of the internal short circuit in the lithium-ion battery, and cannot guarantee that the battery can continue to operate under the abnormal conditions. In the above solutions, the temperature in the battery would still rise sharply after the internal short circuit occurs in the battery. When the battery temperature rises sharply, if the safety component fails to respond immediately, dangers of different degrees would still occur. In addition, in these solutions, even the safety component responds and successfully avoids the hazard of the battery, the battery still cannot continue to operate.

Therefore, it is necessary to provide a design of a current collector and a battery that can effectively prevent accidents such as firing and explosion caused by the occurrence of the internal short circuit under the abnormal conditions such as collision, extrusion or puncture, without affecting the normal operation of the battery.

SUMMARY

The present disclosure provides a current collector, an electrode plate including the current collector, and a battery.

A first aspect of the present disclosure provides current collector. The current collector includes: an insulation layer; and at least one conductive layer located above at least one surface of the insulation layer. The insulation layer is used to support the at least one conductive layer. The at least one conductive layer is used to support an electrode active material layer. The at least one conductive layer each has a thickness of D2, wherein 300 nm $\leq$ D2 $\leq$ 2 µm. The current collector further includes a protective layer provided on a surface of each of the at least one conductive layer facing towards the insulation layer.

A second aspect of the present disclosure provides an electrode plate including the current collector according to the first aspect.

A third aspect of the present disclosure provides a battery including the electrode plate according to the second aspect.

The technical solutions of the present disclosure have at least the following beneficial effects.

In the current collector according to present disclosure, a protective layer is provided between the insulation layer and the conductive layer, the protective layer has a thickness of D2, which satisfies 300 nm $\leq$ D2 $\leq$ 2 µm. Firstly, in the current collector according to the present disclosure, a short-circuit resistance can be increased in the event of the short circuit under abnormal conditions of the battery, so that the short-circuit current and the short-circuit heats generated during the short circuit are greatly reduced, thereby improving the safety performance of the battery. Secondly, the protective layer according to the present disclosure forms an integral supporting structure to protect the conductive layer, thereby preventing the conductive layer from being oxidized, corroded or damaged. Finally, the protective layer according to the present disclosure also intensifies the bonding force between the insulation layer and the conductive layer, thereby improving the mechanical strength of the current collector. Therefore, the current collector according to the present disclosure can not only improve the safety performance of the battery, but also have a good operating stability and longer service life.

REFERENCE SIGNS

1—positive electrode plate;
10—positive current collector;
101—positive insulation layer;
102—positive conductive layer;
103—positive protective layer;
11—positive active material layer;
2—negative electrode plate;
20—negative current collector;
201—negative insulation layer;
202—negative conductive layer;
203—negative protective layer;
21—negative active material layer;
3—separator;
4—nail.

Description of Embodiments

The present disclosure is further described below by means of embodiments. It should be understood that these embodiments are merely used for illustrating the present disclosure, but not intended to limit the present disclosure. It should be clear that the described embodiments are merely part of the embodiments of the present disclosure rather than all of the embodiments. All other embodiments obtained by those skilled in the art without paying creative labor shall fall into the protection scope of the present disclosure.

The structure and properties of the current collector according to the first aspect of the embodiments of the present disclosure is described in details below.

The present disclosure relates to a current collector. The current collector includes an insulation layer and at least one conductive layer located above at least one surface of the insulation layer. The insulation layer is used to support the conductive layer, and the conductive layer is used to support an electrode active material layer. The conductive layer has a thickness of D2, and 300 nm $\leqslant$ D2 $\leqslant$ 2 μm. The current collector further includes a protective layer, and the protective layer is provided on a surface of one of the at least one conductive layer facing towards the insulation layer. That is, the protective layer is provided between the insulation layer and the conductive layer.

Firstly, the insulation layer of the current collector according to the present disclosure is non-conductive, so its resistance is large. This can improve the short circuit resistance of the battery when the short circuit occurs under abnormal conditions, such that the short circuit current can be greatly reduced, and thus the heat generated by the short circuit can be greatly reduced, thereby improving the safety performance of the battery. Secondly, the weight energy density of the battery can be increased by replacing the conventional current collector of metal foil with the insulation layer. In the meantime, the current collector according to the present disclosure further includes a conductive layer disposed on the insulation layer, the conductive layer has a specific thickness and is provided with a protective layer. On one hand, the conductive layer can ensure that the current collector is capable of providing electrons to the electrode active material layer, i.e., the conductive layer has effects of conduction and current collection. On the other hand, the conductive layer having the specific thickness can further guarantee that the current collector has a relatively large resistance, thereby ensuring that the battery has a good safety performance and relatively large weight energy density. Thirdly, according to the present disclosure, the protective layer is located between the insulation layer and the conductive layer in such a manner that an integral supporting structure can be formed to protect the conductive layer, thereby preventing the conductive layer from being oxidized, corroded or damaged. Fourthly, the protective layer according to the present disclosure also intensifies the bonding force between the insulation layer and the conductive layer, thereby improving the mechanical strength of the current collector. Therefore, the current collector according to the present disclosure can not only improve the safety performance of the battery, but also have a good operating stability and a long service life.

Conductive Layer

In the current collector according to the embodiments of the present disclosure, the conductive layer has a thickness of D2, and 300 nm $\leqslant$ D2 $\leqslant$ 2 μm.

The conductive layer is made of a material selected from at least one of a metallic conductive material and a carbon-based conductive material. The metallic conductive material is preferably selected from a group consisting of aluminum, copper, nickel, titanium, silver, nickel-copper alloy, aluminum-zirconium alloy, or combinations thereof. The carbon-based conductive material is preferably selected from a group consisting of graphite, acetylene black, graphene, carbon nanotubes, or combinations thereof.

In the existing lithium-ion batteries, when an internal short circuit occurs in the battery under an abnormal situation, a large current would be instantaneously generated, a large quantity of heat is generated by the short circuit correspondingly. The heat usually further result in alumino-thermal reaction at the positive current collector made of aluminum foil, which can cause the firing, explosion, etc. of the battery.

In the embodiments of the present disclosure, the above technical problems are solved by using a special current collector, in which an insulation layer is used to support and the thickness of the conductive layer is greatly reduced. Since the insulation layer is non-conductive, the current collector has a relative high resistance. In this way, in the event of the short circuit under abnormal conditions of the battery, a short-circuit resistance can be increased, so that the short-circuit current and the generated short-circuit heat can be greatly reduced, thereby improving the safety performance of the battery.

Generally, the internal resistance of the battery includes ohmic internal resistance of the battery and internal resistance of the battery polarization. The resistances of the active material, current collector and interface, and the electrolyte composition all have a significant influence on the internal resistance of the battery. In the event of the short circuit under abnormal conditions, the internal resistance of the battery will be greatly reduced due to the occurrence of the internal short circuit. Therefore, by increasing the resistance of the current collector, the internal resistance of the battery in the event of the short circuit can be increased, thereby improving the safety performance of the battery.

The conductive layer has a thickness which is sufficient to have effects of conduction and current collection. If the thickness of the conductive layer is too small, the effects of conduction and current collection are too poor, the polarization of the battery can be severe, and the conductive layer is also likely to be damaged during the processing process of the electrode plate. If the thickness of the conductive layer is too large, a weight energy density of the battery can be affected, and the resistance of the current collector can be reduced, which is not conducive to improving the safety performance of the battery.

An upper limit of the thickness $D2$ of the conductive layer may be 2 μm, 1.8 μm, 1.5 μm, 1.2 μm, 1 μm, or 900 nm. A lower limit of the thickness $D2$ of the conductive layer may be 800 nm, 700 nm, 600 nm, 500 nm, 450 nm, 400 nm, 350 nm, or 300 nm. The thickness of the conductive layer is in a range consisting of any one upper limit and any one lower limit, preferably, 500 nm $\leq D2 \leq$ 1.5 μm.

The conductive layer can formed on the insulation layer by means of at least one of mechanical rolling, bonding, vapor deposition, and electroless plating. With respect to the vapor deposition, physical vapor deposition (PVD) is preferable. Preferably, the physical vapor deposition is at least one of evaporation deposition and sputtering deposition. As regards the evaporation deposition, at least one of vacuum evaporation, thermal evaporation deposition, electron beam evaporation method (EBEM) is preferable. As regards the sputtering deposition, magnetron sputtering is preferable.

Protective Layer

The current collector according to the present disclosure includes a protective layer disposed on a surface of the conductive layer facing towards the insulation layer. The protective layer is disposed between the insulation layer and the conductive layer. In the embodiments of the disclosure, the protective layer disposed between the insulation layer and the conductive layer is referred to as a lower protective layer.

The lower protective layer according to the present disclosure can constitute a complete support structure to protect the conductive layer, so as to better exert a protective effect on the conductive layer, thereby preventing the conductive layer from being oxidized, corroded or damaged. In addition, the lower protective layer according to the present disclosure can also enhance the bonding force between the insulation layer and the conductive layer, thereby improving the mechanical strength of the current collector.

The lower protective layer is made of a material selected from a group consisting of metal, metal oxide, conductive carbon, or combinations thereof. The metal is preferably at least one of nickel, chromium, nickel-based alloy (such as nickel-chromium alloy), or copper-based alloy (such as copper-nickel alloy). The metal oxide is preferably at least one of aluminum oxide, cobalt oxide, chromium oxide, or nickel oxide. The conductive carbon is preferably at least one of conductive carbon black, carbon nanotubes, acetylene black, or graphene.

The nickel-chromium alloy is an alloy made of metal nickel and metal chromium. In an embodiment, a mole ratio of nickel element to chromium element is 1:99 to 99:1. The copper-based alloy is an alloy formed by adding one or more other elements to a matrix of pure copper. Copper-nickel alloy is preferable. In an embodiment, in the copper-nickel alloy, the mole ratio of nickel element to copper element is 1:99 to 99:1.

Further, in an embodiment, the material of the protective layer is selected from metal or metal oxide.

When the current collector is a positive current collector, aluminum is usually used as the material of the conductive layer. When the lower protective layer is selected from a metallic material, preferred is a metallic material having a hardness greater than a hardness of aluminum and/or a corrosion-resistant metallic material, so as to form a protective layer having the increased hardness and/or corrosion-resistance, thereby providing an effective support for the conductive layer and thus better protecting the conductive layer. When the lower protective layer is selected from metal oxide, the metal oxide also can provide the effective support for the conductive layer due to its low ductility and high hardness.

When the current collector is a positive current collector, since the metal oxide material has a relatively greater resistance than the metallic material, the lower protective layer made of a metal oxide material can further increase the resistance of the positive current collector to some extent, thereby increasing the short-circuit resistance of battery in the event of short circuit under abnormal conditions, and thus improving the safety performance of the battery. In addition, since the metal oxide has a greater specific surface area, the bonding force between the lower protective layer made of the metal oxide material and the insulation layer is enhanced. Meanwhile, since the specific surface area of the metal oxide is greater, the lower protective layer provide a greater roughness to the insulation layer, so as to enhance the bonding force between the conductive layer and the insulation layer, thereby increasing the overall strength of the current collector.

As an improvement of the current collector according to the present disclosure, the lower protective layer has a thickness of $D3$, in which $D3 \leq \frac{1}{10} D2$ and 1 nm $\leq D3 \leq$ 200 nm. That is, the thickness $D3$ is smaller than or equal to 1/10 of $D2$ and is in a range of 1 nm to 200 nm.

An upper limit of the thickness $D3$ of the lower conductive layer may be 200 nm, 180 nm, 150 nm, 120 nm, 100 nm, 80 nm, 60 nm, 55 nm, 50 nm, 45 nm, 40 nm, 30 nm, or 20 nm. A lower limit of the thickness $D3$ of the lower conductive layer may be 1 nm, 2 nm, 5 nm, 8 nm, 10 nm, 12 nm, 15 nm, or 18 nm. The thickness $D3$ of the lower conductive layer is in a range consisting of any one upper limit and any one lower limit. If the protective layer is too thin, it is not enough to protect the conductive layer; and if the protective layer is too thick, it has a limited effect on improving the mechanical strength or the safety of the current collector, etc., but may reduce the weight energy density and volume energy density of the battery. Preferably, 10 nm $\leq$ D3 $\leq$ 50 nm.

The current collector according to the present disclosure further includes a protective layer disposed on a surface of the conductive layer facing away from the insulation layer. In the embodiments of the disclosure, for convenience of description, the protective layer on the surface of the conductive layer facing away from the insulation layer disposed is referred to as an upper protective layer.

The upper protective layer is made of a metallic material, and the metallic material is selected from the group consisting of nickel, chromium, nickel-based alloy, copper-based alloy, or combinations thereof. The upper protective layer made of the metallic material can not only improve the mechanical strength and corrosion resistance of the conductive layer, but also reduce the polarization of the electrode plate. Since the metal upper protective layer has good conductivity, it can better provide the electrode active material layer in contact therewith with electrons, thereby reducing the polarization in the electrode active material layer and improving the electrochemical performance of the battery.

As an improvement of the current collector according to the present disclosure, the upper protective layer has a thickness D3', and D3' $\leq$ 1/10 D2 and 1 nm $\leq$ D3' $\leq$ 200 nm.

An upper limit of the thickness D3' of the upper conductive layer may be 200 nm, 180 nm, 150 nm, 120 nm, 100 nm, 80 nm, 60 nm, 55 nm, 50 nm, 45 nm, 40 nm, 30 nm, or 20 nm. A lower limit of the thickness D3' of the upper conductive layer may be 1 nm, 2 nm, 5 nm, 8 nm, 10 nm, 12 nm, 15 nm, or 18 nm. The thickness D3' of the upper conductive layer is in a range combing any one upper limit and any one lower limit. If the protective layer is too thin, it is not enough to have the above effects; and if the protective layer is too thick, the weight energy density and volume energy density of the battery may be reduced. Preferably, 10 nm $\leq$ D3' $\leq$ 50 nm.

As regards a ratio of the thickness of the upper protective layer to the entire thickness of the conductive layer, it is preferable that D3' satisfies: 1/2000 D2 $\leq$ D3' $\leq$ 1/10 D2, that is, the thickness of the upper protective layer is 1/2000 to 1/10 of the thickness D2. More preferably, D3' satisfies: 1/1000 D2 $\leq$ D3' $\leq$ 1/101 D2.

In an embodiment of the present disclosure, the thickness of the lower protective layer D3 and the thickness of the upper protective layer D3' satisfy a relation of 1/2 D3' $\leq$ D3 $\leq$ 4/5 D3'. That is, the thickness of the upper protective layer is greater than the thickness of the lower protective layer.

The protective layer can be formed on the conductive layer by means of vapor deposition, an in-situ formation method, a coating method, or the like. With respect to the vapor deposition, physical vapor deposition (PVD) is preferable. Preferably, the physical vapor deposition is at least one of evaporation deposition and sputtering deposition. The evaporation deposition is preferably at least one of vacuum evaporating, thermal evaporation deposition, electron beam evaporation method (EBEM). As regards the sputtering deposition, magnetron sputtering is preferable. The in-situ formation method is preferably an in-situ passivation method, i.e., a method for in-situ forming a metal oxide passivation layer on a metal surface. The coating method is preferably one of roll coating, extrusion coating, blade coating, gravure coating, and the like.

FIGS. 1-8 are schematic structural diagrams of current collectors according to the embodiments of the present disclosure.

The structural schematic diagrams of positive nt collectors are shown in FIGS. 1 to 4.

Figure 1:
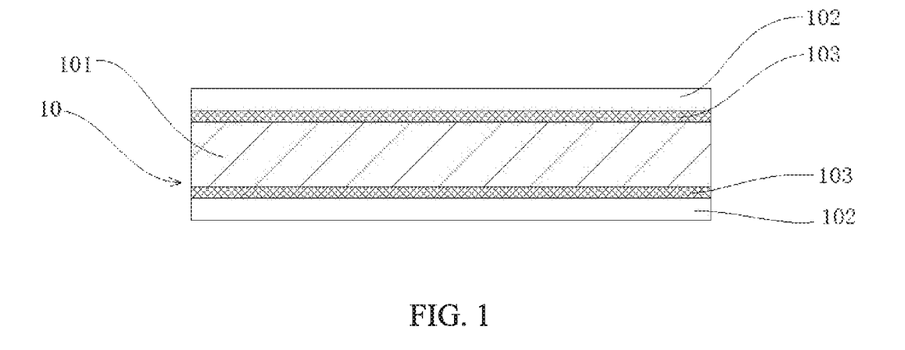
FIG. 1 is a structural schematic diagram of a positive current collector according to an embodiment of the present disclosure.

As shown in FIG. 1, the positive current collector 10 includes a positive insulation layer 101 and two positive conductive layers 102 provided above two opposite surfaces of the positive insulation layer 101. A protective layer 103, which is also referred to as a lower protective layer, is provided on a surface of each positive conductive layer 102 facing towards the positive insulation layer 101.

Figure 2:
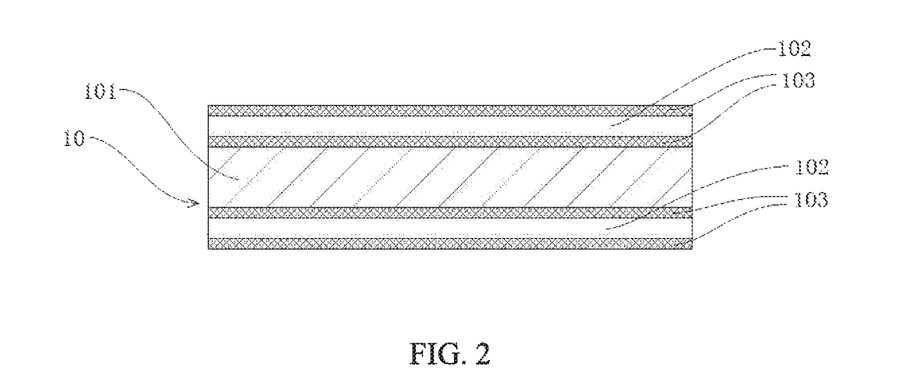
FIG. 2 is a structural schematic diagram of another positive current collector according to an embodiment of the present disclosure.

As shown in FIG. 2, the positive current collector 10 includes a positive insulation layer 101 and two positive conductive layers 102 provided above two opposite surfaces of the positive insulation layer 101. Two protective layers 103 are provided on two opposite surfaces of each positive conductive layer 102, i.e., an upper protective layer and a lower protective layer.

Figure 3:
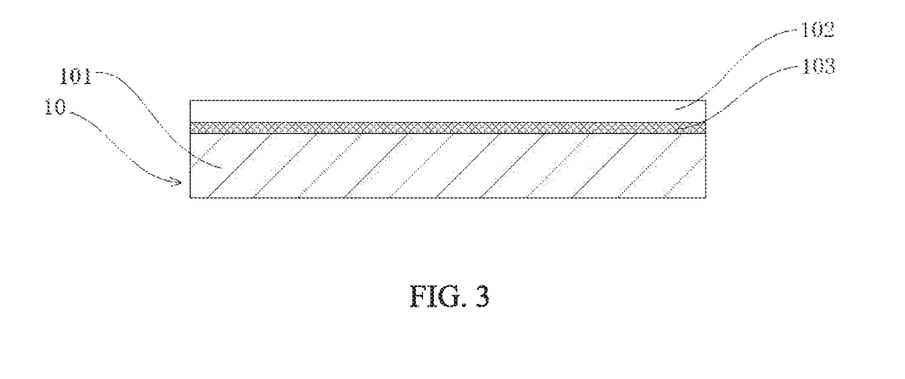
FIG. 3 is a structural schematic diagram of another positive current collector according to an embodiment of the present disclosure.

As shown in FIG. 3, the positive current collector 10 includes a positive insulation layer 101 and a positive conductive layer 102 provided above a surface of the positive insulation layer 101. A protective layer 103, which is also referred to as a lower protective layer, is provided on a surface of the positive conductive layer 102 facing towards the positive insulation layer 101.

Figure 4:
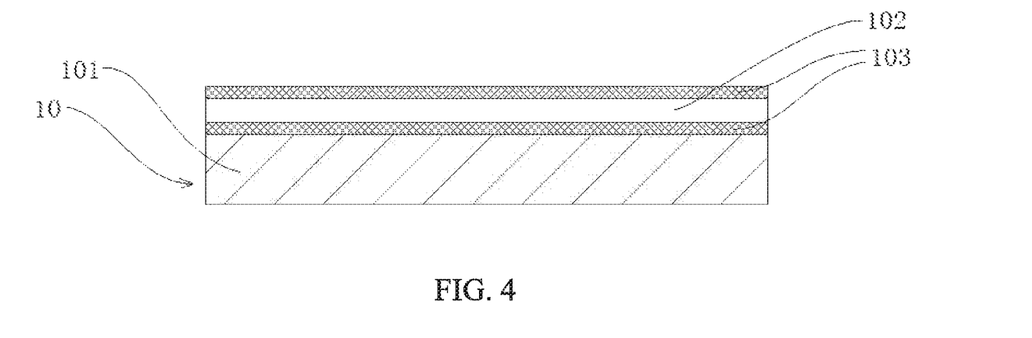
FIG. 4 is a structural schematic diagram of another positive current collector according to an embodiment of the present disclosure.

As shown in FIG. 4, the positive current collector 10 includes a positive insulation layer 101 and a positive conductive layers 102 provided above a surface of the positive insulation layer 101. Two protective layers 103 are provided on two opposite surfaces of the positive conductive layer 102, i.e., an upper protective layer and a lower protective layer.

The structural schematic diagrams of negative current collectors are shown in FIGS. 5 to 8.

Figure 5:
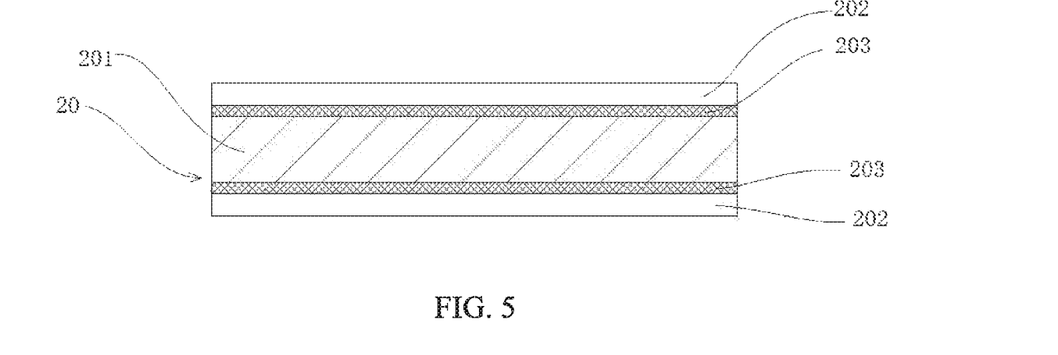
FIG. 5 is a structural schematic diagram of a negative current collector according to an embodiment of the present disclosure.

As shown in FIG. 5, the negative current collector 20 includes a negative insulation layer 201 and two negative conductive layers 202 provided above two opposite surfaces of the negative insulation layer 201. A protective layer 203, which is also referred to as a lower protective layer, is provided on a surface of each negative conductive layer 202 facing towards the negative insulation layer 201.

Figure 6:
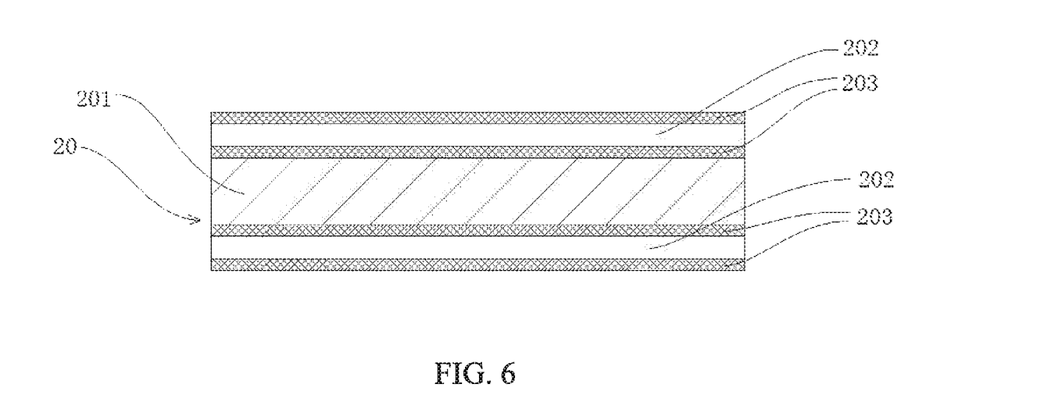
FIG. 6 is a structural schematic diagram of another negative current collector according to an embodiment of the present disclosure.

As shown in FIG. 6, the negative current collector 20 includes a negative insulation layer 201 and two negative conductive layers 202 provided above two opposite surfaces of the negative insulation layer 201. Two protective layers 203 are provided on two opposite surfaces of each negative conductive layer 202, i.e., an upper protective layer and a lower protective layer.

Figure 7:
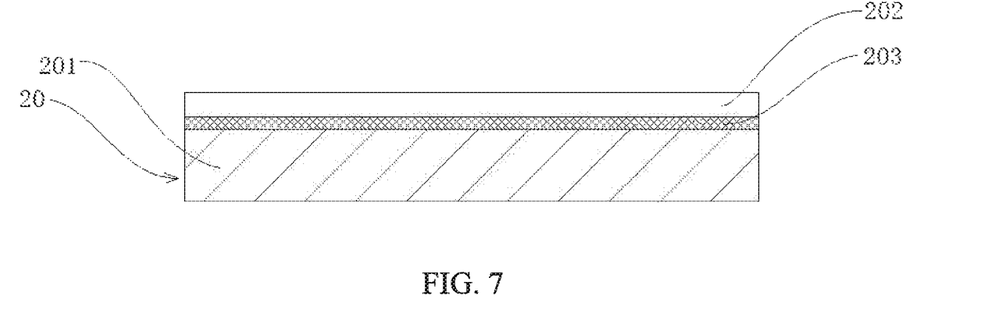
FIG. 7 is a structural schematic diagram of another negative current collector according to an embodiment of the present disclosure.

As shown in FIG. 7, the negative current collector 20 includes a negative insulation layer 201 and a negative conductive layer 202 provided above a surface of the negative insulation layer 201. A protective layer 203, which is also referred to as a lower protective layer, is provided on a surface of the negative conductive layer 202 facing towards the negative insulation layer 201.

Figure 8:
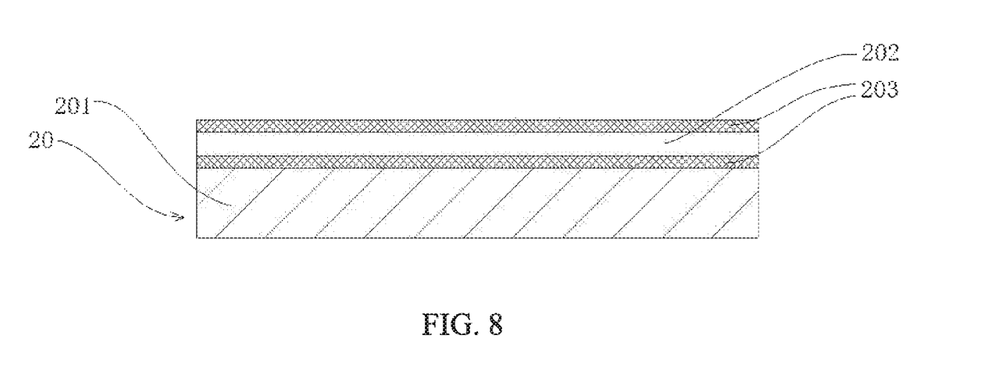
FIG. 8 is a structural schematic diagram of another negative current collector according to an embodiment of the present disclosure.

As shown in FIG. 8, the negative current collector 20 includes a negative insulation layer 201 and a negative conductive layers 202 provided above a surface of the negative insulation layer 201. Two protective layers 203 are provided on two opposite surfaces of the negative conductive layer 202, i.e., an upper protective layer and a lower protective layer.

The protective layers disposed on the two opposite surfaces of the conductive layer can be made of a same material or different materials, and can have a same thickness or different thicknesses.

Insulation Layer

In the current collector according to the embodiments of the present disclosure, the insulation layer is mainly used to support and protect the conductive layer. The insulation layer has a thickness of D1, and 1 µm ≤ D1 ≤ 20 µm. If the insulation layer is too thin, it is likely to be broken during the processing process of the electrode plate. If the insulation layer is too thick, a volume energy density of the battery adopting this current collector can be reduced.

An upper limit of the thickness D1 of the insulation layer may be 20 µm, 15 µm, 12 µm, 10 µm, or 8 µm. A lower limit of the thickness D1 of the insulation layer may be 1 µm, 1.5 µm, 2 µm, 3 µm, 4 µm, 5 µm, 6 µm, or 7 µm. The thickness D1 of the insulation layer is in a range consisting of any one upper limit and any one lower limit, preferably, 2 µm ≤ D1 ≤ 10 µm, and more preferably, 2 µm ≤ D1 ≤ 6 µm.

The insulation layer is made of a material selected from a group consisting of organic polymer insulation material, inorganic insulation material, composite material, or combinations thereof. Preferably, the composite material consists of organic polymer insulation material and inorganic insulation material.

The organic polymer insulation material is selected from a group consisting of polyimide (abbreviated as PA), polyethylene terephthalate (abbreviated as PET), polyimide (abbreviated as PI), polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, poly polyformaldehyde (abbreviated as POM), phenol-formaldehyde resin, ethylene propylene copolymer (abbreviated as PPE), polytetrafluoroethylene (abbreviated as PTFE), silicon rubber, polyvinylidene fluoride (abbreviated as PVDF), polycarbonate (abbreviated as PC), or combinations thereof.

The organic polymer insulation material is selected from a group consisting of $Al_2O_3$, $SiC$, $SiO_2$, or combinations thereof.

The composite material is preferably selected from at least one of epoxy resin glass fiber reinforced composite and polyester resin glass fiber reinforced composite material.

Preferably, the material of the insulation layer is selected from the organic polymer insulation materials. Since the insulation layer usually has a smaller density than the metal, the current collector according to the present disclosure can improve the weight energy density of the battery while improving the safety performance of the battery. In addition, since the insulation layer can well support and protect the conductive layer located on the surface thereof, a breakage of the electrode, which is common in the conventional current collector, is unlikely to occur.

The second aspect of the present disclosure provides an electrode plate. The electrode plate includes the current collector according to the first aspect of the present disclosure and an electrode active material layer formed on the current collector.

Figure 9:
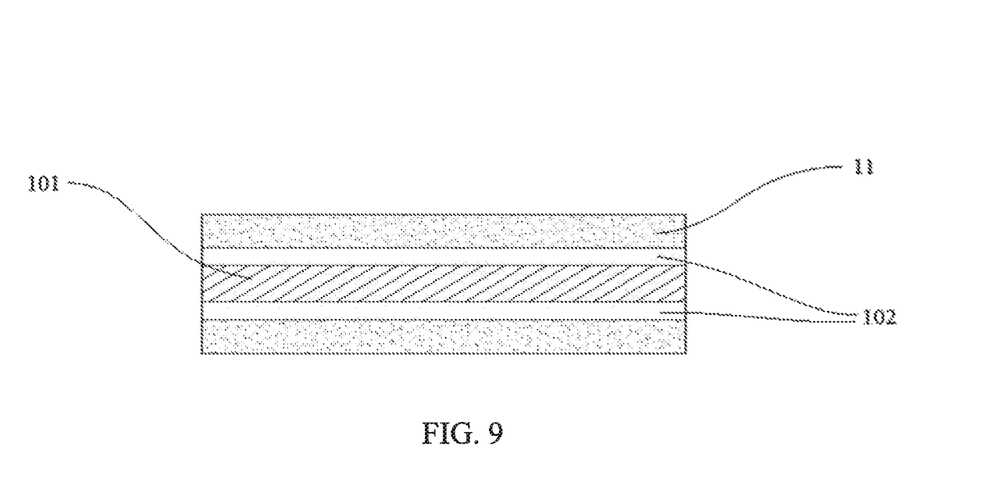
FIG. 9 is a structural schematic diagram of a positive electrode plate according to an embodiment of the present disclosure.
Figure 10:
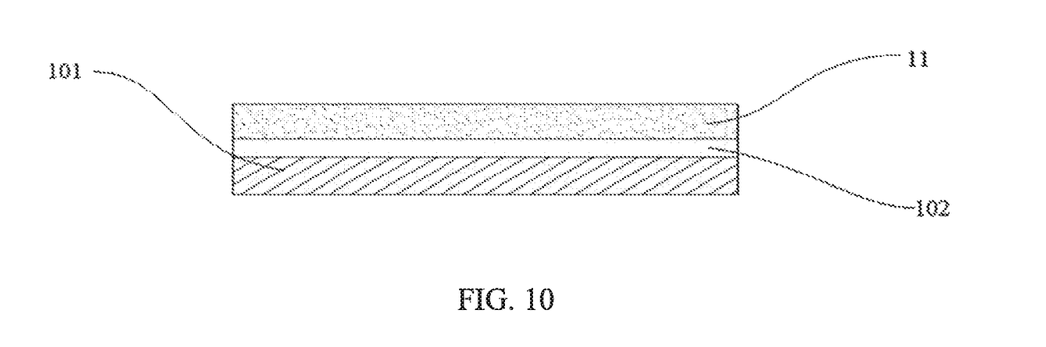
FIG. 10 is a structural schematic diagram of another positive electrode plate according to an embodiment of the present disclosure.

FIGS. 9 and 10 are schematic structural diagrams of positive electrode plates according to embodiments of the present disclosure. As shown in FIGS. 9 and 10, the positive electrode plate 1 includes a positive current collector 10 and two positive active material layers 11 formed on two surfaces of the positive current collector 10. The positive current collector 10 includes a positive insulation layer 101 and two positive conductive layers 102. One or two positive protective layer(s) 103 (not shown) is/are provided on one or both sides of the positive conductive layer 102.

Figure 11:
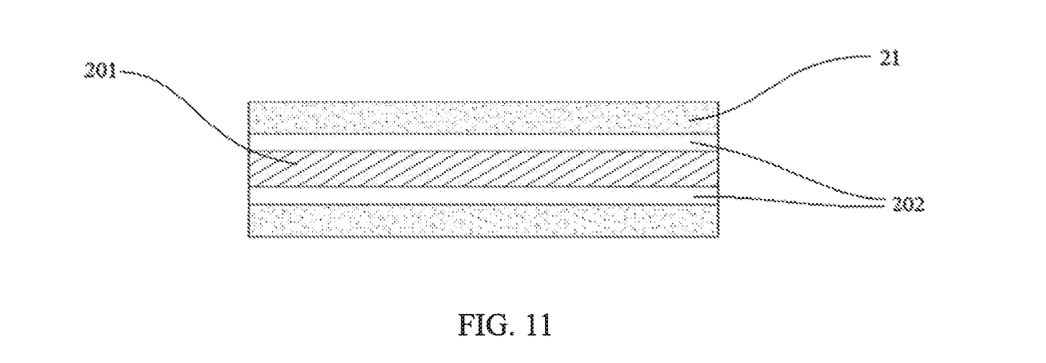
FIG. 11 is a structural schematic diagram of a negative electrode plate according to an embodiment of the present disclosure.
Figure 12:
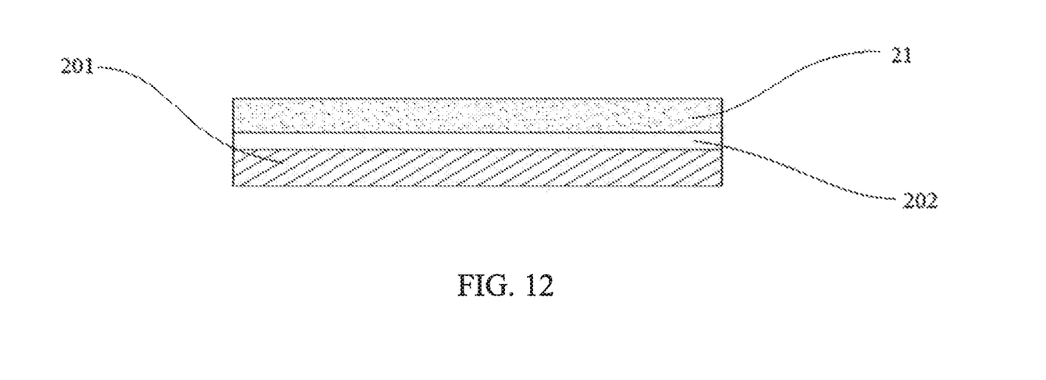
FIG. 12 is a structural schematic diagram of another negative electrode plate according to an embodiment of the present disclosure.

FIGS. 11 and 12 are schematic structural diagrams of negative electrode plates according to embodiments of the present disclosure. As shown in FIGS. 11 and 12, the negative electrode plate 2 includes a negative current collector 20 and two negative active material layers 21 formed on two surfaces of the negative current collector 20. The negative current collector 20 includes a negative insulation layer 201 and two negative conductive layers 202. One or two negative protective layer(s) 203 (not shown) is/are provided on one or both sides of the negative conductive layer 202.

As shown in FIGS. 1, 2, 5 and 6, when each of the both surfaces of the insulation layer is provided with a conductive layer, one or two protective layer(s) is/are provided on one or both surfaces of each conductive layer, and the electrode active material is coated on both surfaces of the current collector, so as to obtain the positive and negative electrode plates, as shown in FIG. 9 and FIG. 11, respectively. The positive and negative electrode plates can be directly applied in a battery.

As shown in FIGS. 3, 4, 7 and 8, when only one surface of the insulation layer is provided with a conductive layer, one or two protective layer(s) is/are provided on one or both surfaces of the conductive layer, and the electrode active material is coated on a surface of the current collector, so as to obtain the positive and negative electrode plates, as shown in FEG. 10 and FIG. 12, respectively. The positive and negative electrode plates can be applied in a battery after being bent.

The embodiments of the present disclosure also provide a battery. The battery includes a positive electrode plate, a separator and a negative electrode plate.

The positive electrode plate and/or the negative electrode plate is the electrode plate according to the above embodiments of the present disclosure. The battery according to the present disclosure can be of a wound type or a laminated type. The battery can also be one of a lithium ion secondary battery, a primary lithium battery, a sodium ion battery, and a magnesium ion battery. However, it is not limited to these batteries.

Further, the embodiments of the present disclosure also provide a battery. The battery includes a positive electrode plate, a separator and a negative electrode plate. Only the positive electrode plate is the electrode plate according to the above embodiments of the present disclosure.

Preferably, the positive electrode plate of the battery according to the present disclosure employs the electrode plate according to the present disclosure. Since the conventional positive current collector has a high aluminum content, when the short circuit occurs under the abnormal condition of the battery, the heat generated at the short-circuit point can cause a severe aluminothermal reaction, which generates a huge amount of heat and further causes the explosion or other accidents of the battery. When the battery adopts the positive electrode plate according to the present disclosure, the aluminothermal reaction can be avoided due the greatly reduced aluminum content in the positive current collector, thereby significantly improving the safety performance of the battery.

Figure 13:
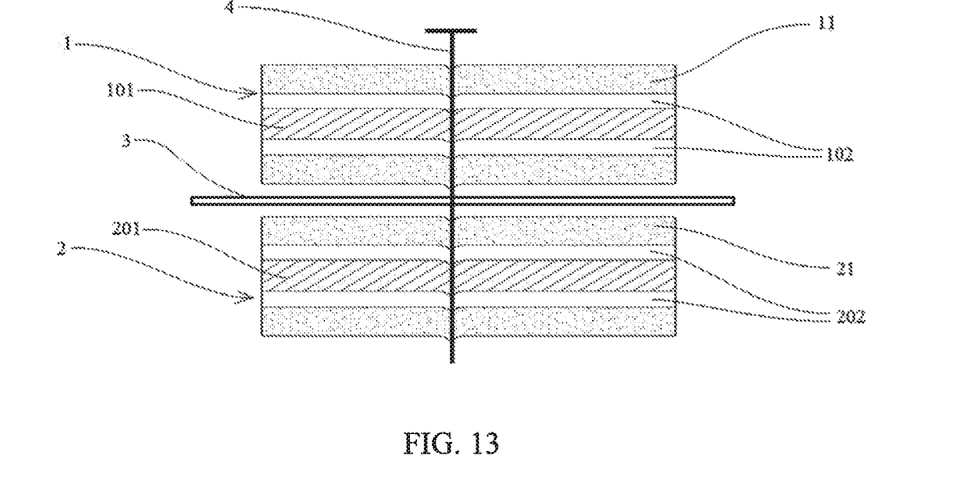
FIG. 13 is a schematic diagram of a nailing experiment according to the present disclosure.

In the present disclosure, a nailing experiment is used to simulate the abnormal conditions of the battery and observe a change of the battery after the nailing. FIG. 13 is a schematic diagram of a nailing experiment according to the present disclosure. For the reason of simplicity, FIG. 13 merely illustrates that a nail 4 punctures one layer of positive electrode plate 1, one layer of separator 3 and one layer of negative electrode plate 2 of the battery. It should be clear that in the actual nailing experiment, the nail 4 penetrates the entire battery, which generally includes a plurality of layers of positive electrode plate 1, separator 3 and negative electrode plate 2. When a short circuit occurs in the battery due to the nailing, the short-circuit current is greatly reduced, and the heat generated during the short circuit is controlled within a range that the battery can fully absorb. Therefore, the heat generated at the position where the internal short-circuit occurs can be completely absorbed by the battery, and the increase in temperature is also very small, so that the damage on the battery caused by the short circuit can be limited to the nailing position, and only a "point break" can be formed without affecting the normal operation of the battery in a short time.

Embodiments

1. Preparation of Current Collector

An insulation layer having a certain thickness is selected, and a conductive layer having a certain thickness is formed on a surface of the insulation layer by means of vacuum evaporation, mechanical rolling or bonding, and then a protective layer is formed by means of vapor deposition, in-situ formation method or coating method.

1.1 Formation of Conductive Layer

The conductive layer can be formed in following manners.

(1) The conditions of the vacuum evaporation for forming the conductive layer are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on a surface of the insulation layer, so as to form the conductive layer.

(2) The conditions of the mechanical rolling for forming the conductive layer are as follows: a foil of a material used for the conductive layer is placed in a mechanical roller, rolled to a predetermined thickness by applying a pressure in a range of 20 t to 40 t, and then placed on a surface of the insulation layer that has been subjected to a surface cleaning treatment, and finally the both are placed in the mechanical roller, so as to be tightly bonded by applying a pressure in a range of 30 t to 50 t.

(3) The conditions of the bonding method for forming the conductive layer are as follows: a foil of a material used for the conductive layer is placed in a mechanical roller, rolled to a predetermined thickness by applying a pressure in a range of 20 t to 40 t, and then a mixed solution consisting of PVDF and NMP is applied on a surface of the insulation layer that has been subjected to a surface cleaning treatment, and finally the conductive layer having the above-mentioned predetermined thickness is bonded to the surface of the insulation layer and dried at 100° C.

1.2 Formation of Protective Layer

The protective layer can be formed in following manners:

(1) A protective layer is firstly formed on a surface of the insulation layer by means of vapor deposition or coating, then a conductive layer having a certain thickness is formed on the protective layer disposed on the insulation layer by means of vacuum evaporation, mechanical rolling or bonding, so as to prepare a current collector including the protective layer located between the insulation layer and conductive layer. In addition, alternatively, on the basis of the above, an upper protective layer is further formed on a surface of the conductive layer facing away from the insulation layer by means of vapor deposition, in-situ formation, or coating, so as to prepare a current collector including upper and lower protective layers, which are located on two opposite surface of the conductive layer.

(2) A protective layer is firstly formed on a surface of a conductive layer by means of vapor deposition, in-situ formation, or coating, then the above conductive layer provided with the protective layer is mechanically rolled or bonded to a surface of an insulation layer and the protective layer is located between the insulation layer and conductive layer, so as to prepare a current collector including the protective layer located between the insulation layer and conductive layer. In addition, alternatively, on the basis of the above, a protective layer is further formed on a surface of the conductive layer facing away from the insulation layer by means of vapor deposition, n-situ formation, or coating, so as to prepare a current collector including upper and lower protective layers, which are located on two opposite surface of the conductive layer.

(3) In addition to the above preparation methods, the present disclosure further takes the current collectors including the protective layer provided on the surface of the conductive layer facing away from the insulation layer (i.e., the upper surface of the conductive layer) as Comparative Examples. The Comparative Examples are prepared as below:

(3.1) A protective layer is firstly formed on a surface of a conductive layer by means of vapor deposition, in-situ formation, or coating, then the above conductive layer provided with the protective layer is mechanically rolled or bonded to a surface of an insulation layer and the protective layer is located on a surface of the conductive layer facing away from the insulation layer.

(3.2) A conductive layer having a certain thickness is formed on a surface of the insulation layer by means of vapor deposition, mechanical rolling or bonding, then a protective layer is formed on a surface of the conductive layer facing away from the insulation layer by means of vapor deposition, in-situ formation, or coating, so as to prepare a current collector including the protective layer located on the surface of the conductive layer facing away from the insulation layer.

In the embodiments of preparation, the vapor deposition is vacuum evaporation, the in-situ formation is in-situ passivation, and the coating is blade coating.

The conditions of the vacuum evaporation for forming the protective layer are as follows: a sample is placed in a vacuum evaporation chamber after a surface cleaning treatment, a material of the protective layer in a evaporation chamber is melted and evaporated at a high temperature in a range of 1600° C. to 2000° C., the evaporated material of the protective layer passes through a cooling system in the vacuum evaporation chamber and is finally deposited on a surface of the sample, so as to form a protective layer.

The conditions of the in-situ passivation are as follows: the conductive layer is placed in a high-temperature oxidizing environment, the temperature is controlled within a range of 160° C. to 250° C., while maintaining the oxygen supply in the high-temperature environment, and the processing time is 30 min, so as to form a protective layer of metal oxide.

The conditions of the gravure coating method are as follows: a material of the protective layer and NMP are mixed and stirred to form a slurry, then the slurry of the above-mentioned material of the protective layer (solid material content is 20 to 75%) is coated on a surface of a sample, the thickness of the coating is controlled by a gravure roll, and finally the coating is dried at 100° C. to 130° C.

Specific parameters of the prepared current collectors having protective layers) are listed in Tables 1 and 2.

In Table 1, Current Collector 1# to 6# have no protective layer; in Table 2, "Current Collector 1-1#" represents that the conductive layer is the same as the conductive layer of Current Collector 13#, and so on, and "Current Collector 2-7#" represents that the conductive layer is the same as the conductive layer of Current Collector 2#, and so on.

3. Preparation of Electrode Plate

Slurry of positive electrode or negative electrode is coated on a surface of the current collector by a conventional coating process of battery and dried at 100° C., so as to obtain a positive electrode plate or negative electrode plate.

Conventional positive electrode plate: current collector is an Al foil with a thickness of 12 μm, and the electrode active material layer is a ternary (NCM) material layer with a thickness of 55 μm.

Conventional negative electrode plate: current collector is a Cu foil with a thickness of 8 μm, and the electrode active material layer is a graphite layer with a thickness of 55 μm.

The corresponding numbered positive electrode plates are obtained by coating a ternary (NCM) material layer with a thickness of 55 μm on the prepared positive current collector, as shown in Table 3.

4. Preparation of Battery:

According to a conventional battery preparing process, a positive electrode plate (compaction density: 3.4 g/cm³), a PP/PE/PP separator and a negative electrode plate (compaction density: 1.6 g/cm³) together are winded to form a bare cell, then the bare cell is placed into a battery case, an electrolyte (EC:EMC in a volume ratio of 3:7, $LiFF_6$:1 mol/L) is injected into the case, following by sealing, formation, and the like, so as to obtain a lithium-ion secondary battery.

Specific compositions of the batteries prepared in the embodiments of the present disclosure and the batteries of the Comparative Examples are shown in Table 4.

TABLE 1

| Current Collector No. | insulation layer material | D1 | conductive layer material | D2 | forming method of conductive layer |
|---|---|---|---|---|---|
| Current Collector 1# | PI | 2 μm | Al | 800 nm | vacuum evaporation |
| Current Collector 2# | PI | 5 μm | Al | 2 μm | vacuum evaporation |

TABLE 2

| Current Collector No. | lower protective layer material | D3 | upper protective layer material | D3' | forming method of protective layer |
|---|---|---|---|---|---|
| Current Collector 1-1# | nickel oxide | 1 nm | / | / | vacuum evaporation |
| Current Collector 1-2# | nickel | 5 nm | / | / | vacuum evaporation |
| Current Collector 1-3# | nickel oxide | 10 nm | / | / | vacuum evaporation |
| Current Collector 1-4# | aluminum oxide | 20 nm | / | / | vacuum evaporation |
| Current Collector 1-5# | aluminum oxide | 50 nm | / | / | vacuum evaporation |
| Current Collector 1-6# | aluminum oxide | 80 nm | nickel | 120 nm | vacuum evaporation |
| Current Collector 2-7# | nickel oxide | 100 nm | nickel | 200 nm | vacuum evaporation |
| Current Collector 2-8# | nickel oxide | 200 nm | / | / | vacuum evaporation |
| Current Collector D1-1# | / | / | nickel oxide | 1 nm | vacuum evaporation |
| Current Collector D1-3# | / | / | nickel oxide | 10 nm | vacuum evaporation |
| Current Collector D1-5# | / | / | aluminum oxide | 50 nm | vacuum evaporation |
| Current Collector D1-8# | / | / | nickel oxide | 200 nm | vacuum evaporation |

In Table 2, "/" indicates that no protective layer is provided.

TABLE 3

| positive electrode plate No. | current collector No. |
|---|---|
| positive electrode plate 1# | current collector 1# |
| positive electrode plate 2# | current collector 2# |
| positive electrode plate 1-1# | current collector 1-1# |
| positive electrode plate 1-2# | current collector 1-2# |
| positive electrode plate 1-3# | current collector 1-3# |
| positive electrode plate 1-4# | current collector 1-4# |
| positive electrode plate 1-5# | current collector 1 -5# |
| positive electrode plate 1-6# | current collector 1-6# |
| positive electrode plate 2-7# | current collector 2-7# |
| positive electrode plate 2-8# | current collector 2-8# |
| positive electrode plate D1-1# | current collector D1-1# |
| positive electrode plate D1-3# | current collector D1-3# |
| positive electrode plate D1-5# | current collector D1-5# |
| positive electrode plate D1-8# | current collector D1-8# |

TABLE 4

| Battery No. | composition of battery | |
|---|---|---|
| Battery 1# | conventional positive electrode plate | conventional negative electrode plate |
| Battery 2# | positive electrode plate 1# | conventional negative electrode plate |
| Battery 3# | positive electrode plate 2# | conventional negative electrode plate |
| Battery 4# | positive electrode plate 1-1# | conventional negative electrode plate |
| Battery 5# | positive electrode plate 1-2# | conventional negative electrode plate |
| Battery 6# | positive electrode plate 1-3# | conventional negative electrode plate |

TABLE 4-continued

| Battery No. | composition of battery | |
|---|---|---|
| Battery 7# | positive electrode plate 1-4# | conventional negative electrode plate |
| Battery 8# | positive electrode plate 1-5# | conventional negative electrode plate |
| Battery 9# | positive electrode plate 1-6# | conventional negative electrode plate |
| Battery 10# | positive electrode plate 2-7# | conventional negative electrode plate |
| Battery 11# | positive electrode plate 2-8# | conventional negative electrode plate |
| Battery D1# | positive electrode plate D1-1# | conventional negative electrode plate |
| Battery D2# | positive electrode plate D1-3# | conventional negative electrode plate |
| Battery D3# | positive electrode plate D1-5# | conventional negative electrode plate |
| Battery D4# | positive electrode plate D1-8# | conventional negative electrode plate |

Experimental Examples

1. Test Method of Battery:

A method for testing cycle life of the lithium-ion battery was performed as follows:

le;.5qA lithium-ion battery was charged and discharged at 25° C. and 45° C., respectively, i.e., the battery was firstly charged with a current of IC to a voltage of 4.2V, then was discharged with a current of IC to a voltage of 2.8V, and the discharge capacity after a first cycle was recorded; and the battery was charged and discharged for 1000 cycles as above, and the discharge capacity of the battery after a $1000^{th}$ cycle was recorded. A capacity retention rate after the $1000^{th}$ cycle was obtained by dividing the discharge capacity after the $1000^{th}$ cycle by the discharge capacity after the first cycle.

The experimental results are shown in Table 5.

2. Test Methods of One-Time Nailing Experiment and Six-Time Continuous Nailing Experiment:

(1) One-time Nailing Experiment: a battery that had been fully charged was fixed, a steel needle with a diameter of 8 mm punctured through the battery at a speed of 25 mm/s at room temperature and remained in the battery, and the battery was observed and measured after the nailing was finished.

(2) Six-time Nailing Experiment: a battery that had been fully charged was fixed, six steel needles with a diameter of 8 mm rapidly punctured through the battery successively at a speed of 25 mm/s at room temperature and remained in the battery, and the battery was observed and measured after the nailing was finished.

(3) Measurement of Battery Temperature: a multichannel thermometer was used, and the temperature sensing wires were respectively attached on geometric centers of a nail-inserting surface and an opposite surface of the battery to be nailed; after the nailing was finished, temperature of the battery was measured and tracked for 5 minutes, and the temperatures of the battery at the end of 5 minutes were recorded.

(4) Measurement of Battery Voltage: positive and negative electrodes of each battery to be nailed were connected to test terminals of an internal resistance instrument; after the nailing was finished, voltage of each battery was measured and tracked for 5 minutes, and the voltage of the battery at the end of 5 minutes was recorded.

Data of the recorded temperatures and voltages of the batteries are shown in Table 6.

TABLE 5

| | capacitance retention rate at the $1000^{th}$ cycle | |
|---|---|---|
| Battery No. | 25° C. | 45° C. |
| Battery 1# | 89.2% | 86.5% |
| Battery 2# | 86.5% | 80.7% |
| Battery 3# | 86.8% | 80.8% |
| Battery 4# | 87.2% | 81.4% |
| Battery 5# | 87.9% | 82.1% |
| Battery 6# | 88.3% | 84.7% |
| Battery 7# | 88.4% | 85.9% |
| Battery 8# | 88.9% | 87.1% |
| Battery 9# | 89.2% | 87.6% |
| Battery 10# | 89.4% | 86.3% |
| Battery 11# | 89.9% | 86.8% |
| Battery D1# | 87.1% | 81.0% |
| Battery D2# | 88.2% | 83.2% |
| Battery D3# | 88.7% | 86.2% |
| Battery D4# | 88.9% | 86.0% |

TABLE 6

| | one-time nailing experiment | | six-time continuous nailing experiment | |
|---|---|---|---|---|
| Battery No. | batter temperature rise (° C.) | battery voltage (V) | batter temperature rise (° C.) | battery voltage (V) |
| Battery 1# | 500 | 0 | N/A | N/A |
| Battery 2# | 13.2 | 3.82 | 15.4 | 3.95 |
| Battery 3# | 15.2 | 3.85 | 15.7 | 3.84 |
| Battery 5# | 4.7 | 4.12 | 3.8 | 4.10 |
| Battery 7# | 3.8 | 4.14 | 4.2 | 4.11 |
| Battery 9# | 3.9 | 4.14 | 3.6 | 4.10 |
| Battery 10# | 5.5 | 4.11 | 3.8 | 4.08 |

"N/A" indicates that thermal runaway and damage happened immediately after one steel needle punctured through the battery.

Figure 14:
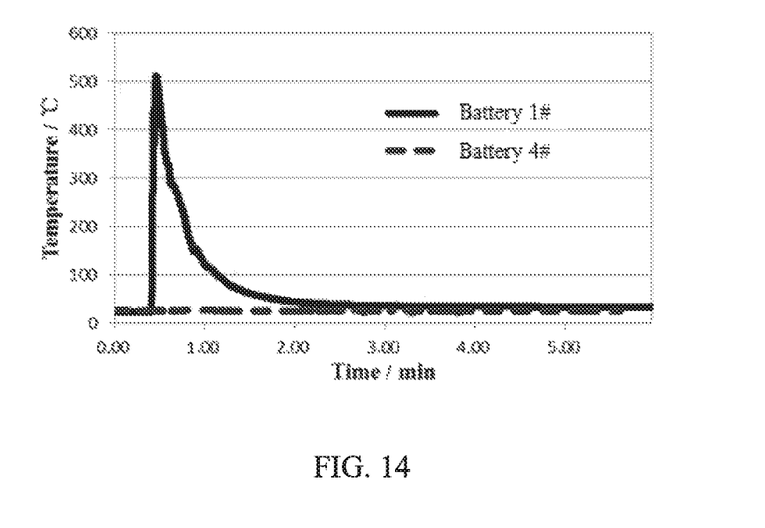
FIG. 14 is a schematic graph of temperatures of Battery 1# and Battery 4# after one-time nailing experiment.
Figure 15:
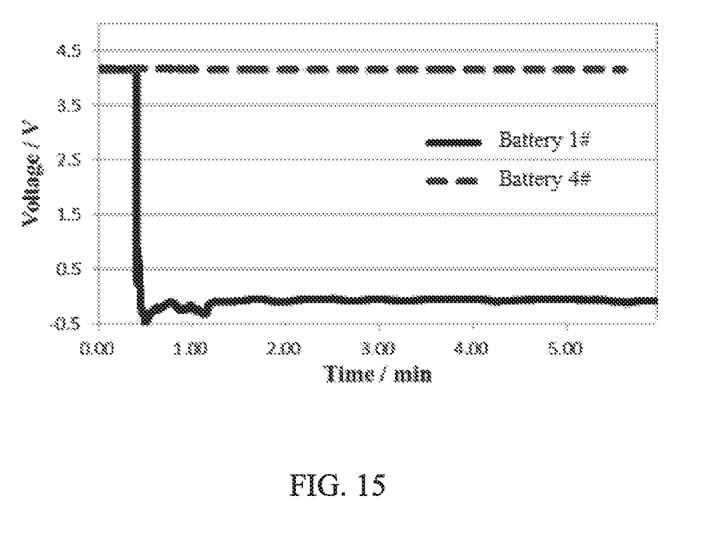
FIG. 15 is a schematic graph of voltages of Battery 1# and Battery 4# after one-time nailing experiment.

The graph of temperature of Battery 1# and Battery 4# with time is shown in FIG. 14, and the graph of voltage of Battery 1# and Battery 4# with time is shown in FIG. 15.

It can be seen from the results in Table 5 that, compared with Battery 1# adopting the conventional positive electrode plate and the conventional negative electrode plate, the batteries adopting the current collectors according to the embodiments of the present disclosure have a good cycle performance, which is equivalent to the cycle performance of a conventional battery. This shows that the current collectors according to the embodiments of the present disclosure do not have any significantly adverse influence on the resulting electrode plates and batteries. Compared with a current collector having no protective layer, the battery prepared by the current collector provided with the protective layer can have a further improved capacity retention rate, indicating a better reliability of the battery.

In addition, the current collectors according to the embodiments of the present disclosure can significantly improve safety performance of the lithium-ion battery. From the results in Table 6, FIG. 14 and FIG. 15, it can be seen that, as regards Battery 1# which does not adopting the current collector according to the embodiments of the present disclosure, the temperature increased abruptly by hundreds of degree Celsius and the voltage dropped abruptly to zero at the moment of nailing. This shows that an internal short circuit occurred at the moment of nailing, a large amount of heats was generated, a thermal runaway and damage of the battery instantly occurred, so that the battery is unable to continue operating. In addition, since the thermal runaway and damage of the battery occurred immediately after the first steel needle punctured into the battery, the continuous nailing with six steel needles cannot be performed on this type of battery.

In contrast, with respect to the lithium-ion batteries using the current collectors according to the embodiments of the present disclosure, temperature rise can be basically controlled at about 10° C. or under 10° C., the voltages are substantially constant, and the batteries can operate normally, no matter in one-time nailing experiment or in six-time continuous nailing experiment. Thus, in the event of an internal short circuit in the battery, the current collector according to the embodiments of the present disclosure can greatly reduce the heat generation caused by the short circuit, thereby improving the safety performance of the battery. In addition, the damage on the battery caused by the short circuit can be limited to a "point", and thus merely forms a "point break", without affecting the normal operation of the battery in a short time.

The preferable embodiments of the present disclosure are disclosed above but are not used to limit the claims. Those skilled in the art may make possible changes and modifications without departing from the concept of the present disclosure. Therefore, the protection scope of the present disclosure is defined by the attached claims.

What is claimed is:

1. A current collector, comprising
   an insulation layer;
   at least one conductive layer located above at least one surface of the insulation layer, wherein the insulation layer is used to support the at least one conductive layer, the at least one conductive layer is used to support an electrode active material layer, and the at least one conductive layer each has a thickness of $D2$,
      wherein 300 nm $\leq D2 \leq$ 2 μm; and
   a first protective layer provided on a surface of each of the at least one conductive layer facing towards the insulation layer, wherein the first protective layer is made of a material selected from a group consisting of metal and metal oxide, or combinations thereof, the metal is at least one of nickel, chromium, nickel-based alloy, or copper-based alloy, and the metal oxide is at least one of aluminum oxide, cobalt oxide, chromium oxide, or nickel oxide; and
   a second protective layer provided on a surface of the at least one conductive layer facing away from the insulation layer, wherein the second protective layer is made of a metallic material, which is selected from a group consisting of metal and metal oxide, or combinations thereof, the metal is at least one of nickel, chromium, nickel-based alloy, copper-based alloy, or combinations thereof, and the metal oxide is aluminum oxide or nickel oxide,
   wherein the first protective layer has a thickness of $D3$, the second protective layer has a thickness of $D3'$, the thickness $D3'$ of the second protective layer is larger than the thickness $D3$ of the first protective layer; and
      $\frac{1}{2} D3' \leq D3 \leq \frac{4}{5} D3'$.

2. The current collector according to claim 1, wherein 500 nm $\leq D2 \leq$ 1.5 μm.

3. The current collector according to claim 1, wherein the at least one conductive layer is made of a material selected from at least one of a metallic conductive material and a carbon-based conductive material,
   wherein the metallic conductive material is selected from a group consisting of aluminum, copper, nickel, titanium, silver, nickel-copper alloy, aluminum-zirconium alloy, or combinations thereof, and
   wherein the carbon-based conductive material is selected from a group consisting of graphite, acetylene black, graphene, carbon nanotubes, or combinations thereof.

4. The current collector according to claim 1, wherein the insulation layer has a thickness of $D1$;
   wherein 1 μm $\leq D1 \leq$ 20 μm; and
   wherein the insulation layer is made of an organic polymer insulation material, which is selected from a polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, ethylene propylene copolymer, polyformaldehyde, epoxy resin, phenol-formaldehyde resin, polytetrafluoroethylene, polyvinylidene fluoride, silicon rubber, polycarbonate, or combinations thereof.

5. The current collector according to claim 1, wherein the current collector is a positive current collector, and
   wherein the first protective layer is made of a material selected from a group consisting of aluminum oxide, cobalt oxide, chromium oxide, nickel oxide, or combinations thereof.

6. The current collector according to claim 5,
   wherein the second protective layer is made of a metallic material, which is selected from a group consisting of nickel, chromium, nickel-based alloy, copper-based alloy, or combinations thereof.

7. The current collector according to claim 1, wherein $D3 \leq \frac{1}{10} D2$ and 1 nm $\leq D3 \leq$ 200 nm; and
   $D3' \leq \frac{1}{10} D2$ and 1 nm $\leq D3' \leq$ 200 nm.

8. An electrode plate, comprising a current collector and an electrode active material layer formed on the current collector,
   wherein the current collector comprises:
   an insulation layer;
   at least one conductive layer located above at least one surface of the insulation layer, wherein the insulation layer is used to support the at least one conductive layer, the at least one conductive layer is used to support the electrode active material layer, and the at least one conductive layer each has a thickness of $D2$,
      wherein 300 nm $\leq D2 \leq$ 2 μm; and
   a first protective layer provided on a surface of each of the at least one conductive layer facing towards the insulation layer, wherein the first protective layer is made of a material selected from a group consisting of metal and metal oxide, or combinations thereof, the metal is at least one of nickel, chromium, nickel-based alloy, or copper-based alloy, and the metal oxide is at least one of aluminum oxide, cobalt oxide, chromium oxide, or nickel oxide; and
   a second protective layer provided on a surface of the at least one conductive layer facing away from the insulation layer, wherein the second protective layer is made of a metallic material, which is selected from a group consisting of metal and metal oxide, or combinations thereof, the metal is at least one of nickel, chromium, nickel-based alloy, copper-based alloy, or combinations thereof, and the metal oxide is aluminum oxide or nickel oxide, wherein the first protective layer has a thickness of D3, the second protective layer has a thickness of D3', the thickness D3' of the second protective layer is larger than the thickness D3 of the first protective layer; and

½ D3' ≤ D3 ≤ ⅘ D3'.

9. The electrode plate according to claim 8, wherein 500 nm ≤ D2 ≤ 1.5 μm.

10. The electrode plate according to claim 8, wherein the at least one conductive layer is made of a material selected from at least one of a metallic conductive material and a carbon-based conductive material, wherein the metallic conductive material is selected from a group consisting of aluminum, copper, nickel, titanium, silver, nickel-copper alloy, aluminum-zirconium alloy, or combinations thereof, and wherein the carbon-based conductive material is selected from a group consisting of graphite, acetylene black, graphene, carbon nanotubes, or combinations thereof.

11. The electrode plate according to claim 8, wherein the insulation layer has a thickness of D1;

wherein 1 μm ≤ D1 ≤ 20 μm; and wherein the insulation layer is made of an organic polymer insulation material, which is selected from a polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, ethylene propylene copolymer, polyformaldehyde, epoxy resin, phenol-formaldehyde resin, polytetrafluoroethylene, polyvinylidene fluoride, silicon rubber, polycarbonate, or combinations thereof.

12. The electrode plate according to claim 8, wherein the current collector is a positive current collector, and wherein the first protective layer is made of a material selected from a group consisting of aluminum oxide, cobalt oxide, chromium oxide, nickel oxide, or combinations thereof.

13. The electrode plate according to claim 12, wherein the second protective layer is made of a metallic material, which is selected from a group consisting of nickel, chromium, nickel-based alloy, copper-based alloy, or combinations thereof.

14. A battery, comprising a positive electrode plate, a separator, and a negative electrode plate, wherein the positive electrode plate and/or the negative electrode plate is an electrode plate, wherein the electrode plate comprises a current collector and an electrode active material layer formed on the current collector, and the current collector comprises:

an insulation layer;

at least one conductive layer located above at least one surface of the insulation layer, wherein the insulation layer is used to support the at least one conductive layer, the at least one conductive layer is used to support the electrode active material layer, and the at least one conductive layer each has a thickness of D2, wherein 300 nm ≤ D2 ≤ 2 μm; and a first protective layer provided on a surface of each of the at least one conductive layer facing towards the insulation layer, wherein the first protective layer is made of a material selected from a group consisting of metal and metal oxide, or combinations thereof, the metal is at least one of nickel, chromium, nickel-based alloy, or copper-based alloy, and the metal oxide is at least one of aluminum oxide, cobalt oxide, chromium oxide, or nickel oxide; and a second protective layer provided on a surface of the at least one conductive layer facing away from the insulation layer, wherein the second protective layer is made of a metallic material, which is selected from a group consisting of metal and metal oxide, or combinations thereof, the metal is at least one of nickel, chromium, nickel-based alloy, copper-based alloy, or combinations thereof, and the metal oxide is aluminum oxide or nickel oxide, wherein the first protective layer has a thickness of D3, the second protective layer has a thickness of D3', the thickness D3' of the second protective layer is larger than the thickness D3 of the first protective layer; and

½ D3' ≤ D3 ≤ ⅘ D3'.

15. The battery according to claim 14, wherein 500 nm ≤ D2 ≤ 1.5 μm.

16. The battery according to claim 14, wherein the at least one conductive layer is made of a material selected from at least one of a metallic conductive material and a carbon-based conductive material, wherein the metallic conductive material is selected from a group consisting of aluminum, copper, nickel, titanium, silver, nickel-copper alloy, aluminum-zirconium alloy, or combinations thereof, and wherein the carbon-based conductive material is selected from a group consisting of graphite, acetylene black, graphene, carbon nanotubes, or combinations thereof.

17. The battery according to claim 14, wherein the insulation layer has a thickness of D1; and wherein 1 μm ≤ D1 ≤ 20 μm; and wherein the insulation layer is made of an organic polymer insulation material, which is selected from a polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, ethylene propylene copolymer, polyformaldehyde, epoxy resin, phenol-formaldehyde resin, polytetrafluoroethylene, polyvinylidene fluoride, silicon rubber, polycarbonate, or combinations thereof.

18. The battery according to claim 14, wherein the current collector is a positive current collector, and wherein the first protective layer is made of a material selected from a group consisting of aluminum oxide, cobalt oxide, chromium oxide, nickel oxide, or combinations thereof.

19. The battery according to claim 14, wherein the second protective layer is made of a metallic material, which is selected from a group consisting of nickel, chromium, nickel-based alloy, copper-based alloy, or combinations thereof.

20. The current collector according to claim 1, wherein 10 nm ≤ D3 ≤ 50 nm; and 10 nm ≤ D3' ≤ 50 nm.

* * * * *